(12) United States Patent
Li et al.

(10) Patent No.: US 10,410,104 B2
(45) Date of Patent: Sep. 10, 2019

(54) TWO-DIMENSIONAL DOT MATRIX BARCODE ENCODING AND READING METHODS

(71) Applicant: SHENZHEN MPR TECHNOLOGY CO., LTD, Shenzhen, Guangdong (CN)

(72) Inventors: Zhengfang Li, Guangdong (CN); Zhiguo Chang, Guangdong (CN)

(73) Assignee: SHENZHEN MPR TECHNOLOGY CO., LTD, Shenzhen, Guangdong (CN)

(*) Notice: Subject to any disclaimer, the term of this patent is extended or adjusted under 35 U.S.C. 154(b) by 0 days.

(21) Appl. No.: 16/055,149

(22) Filed: Aug. 5, 2018

(65) Prior Publication Data

US 2018/0341845 A1  Nov. 29, 2018

Related U.S. Application Data

(63) Continuation of application No. PCT/CN2017/072161, filed on Jan. 23, 2017.

(30) Foreign Application Priority Data

Feb. 6, 2016 (CN) .......................... 2016 1 0083921

(51) Int. Cl.
*G06K 19/06* (2006.01)
*G06K 7/14* (2006.01)

(52) U.S. Cl.
CPC ......... *G06K 19/06037* (2013.01); *G06K 7/14* (2013.01); *G06K 7/1417* (2013.01); *G06K 19/06* (2013.01); *G06K 19/06046* (2013.01)

(58) Field of Classification Search
CPC ....................................... G06K 7/14

USPC .................................. 235/494, 492
See application file for complete search history.

(56) References Cited

U.S. PATENT DOCUMENTS

| | | |
|---|---|---|
| 2006/0196950 A1 | 9/2006 | Kiliccote |
| 2009/0184171 A1 | 7/2009 | Lv |
| 2009/0302114 A1 | 12/2009 | Ao |
| 2011/0206269 A1 | 8/2011 | Tyler |
| 2012/0298761 A1 | 11/2012 | Lin |

(Continued)

FOREIGN PATENT DOCUMENTS

| | | |
|---|---|---|
| CN | 1963843 | 5/2007 |
| CN | 101477638 | 7/2009 |

(Continued)

*Primary Examiner* — Allyson N Trail
(74) *Attorney, Agent, or Firm* — Winston Hsu

(57) ABSTRACT

A two-dimensional dot matrix barcode encoding method comprises: forming a plurality of coordinate calibration blocks, a plurality of data storage blocks and a direction indication block by filling code points into the virtual code point storage blocks, wherein the plurality of coordinate calibration blocks are filled with only one code point located in the center of the virtual code point storage block; the direction indication block is filled with at least two code points, only one code point being located in the center of the virtual code point storage block; the plurality of coordinate calibration blocks and the direction indication block are separated from each other and distributed among the plurality of data storage blocks; and code points filled in the plurality of data storage blocks are used to store data information, where M≥4, N≥4, N≥4, and M and N are both even numbers.

10 Claims, 19 Drawing Sheets

(56) References Cited

U.S. PATENT DOCUMENTS

| | | | | |
|---|---|---|---|---|
| 2013/0026241 A1* | 1/2013 | Sakahashi | ........ | G06K 19/06037 235/494 |
| 2013/0301870 A1* | 11/2013 | Mow | .................... | G06T 1/0021 382/100 |
| 2015/0324946 A1* | 11/2015 | Arce | .................... | G06T 1/0021 382/251 |
| 2016/0283763 A1* | 9/2016 | Hosokane | ........ | G06K 19/06037 |
| 2018/0365459 A1* | 12/2018 | Barnum | ........... | G06K 19/06037 |

FOREIGN PATENT DOCUMENTS

| | | |
|---|---|---|
| CN | 101615259 | 12/2009 |
| CN | 101751591 | 6/2010 |
| CN | 102214312 A | 10/2011 |
| CN | 105894067 | 8/2016 |
| EP | 2849115 A1 | 3/2015 |
| JP | 2009295134 | 12/2009 |

\* cited by examiner

S1: Binarization processing of the grayscale image is performed to obtain a binary image, and a code point is marked in the binary image to determine a barycentric coordinate (x, y) of the code point S2: A row direction and a column direction of the code point and row dividing points and column dividing points are determined: the geometric center of the binary image is taken as a rotation center, the row direction and the column direction of the code point are determined by calculating a mean square error of a projection waveform of the barycentric coordinate of the code point in a predetermined direction at each rotation angle of the binary image, then the barycentric coordinate (x, y) of the code point is projected in the row direction and the column direction, and row dividing points and column dividing points are calculated for the projection waveform by using an autocorrelation method S3: The barycentric coordinate (x, y) of the code point is rotated and converted according to the row direction and the column direction obtained in step S2, a converted code point coordinate (x1, y1) after rotation is calculated, and, a rectangular mesh is formed by using the row dividing points and the column dividing points obtained in step S2 for dividing the code points S4: A two-dimensional matrix corresponding to the rectangular mesh obtained in step S3 is constructed, a block in the rectangular mesh to which the converted code point coordinate belongs is determined according to the converted code point coordinate (x1, y1), and then the converted code point coordinate (x1, y1) is added to a unit of the two-dimensional matrix corresponding to the block S5: A rotation direction and an offset of the two-dimensional matrix are identified according to the unit of the two-dimensional matrix in feature matching with the direction indication block S6: A complete two-dimensional dot matrix barcode is reconstructed according to the rotation direction and the offset, and data stored therein is read

Fig. 11

TWO-DIMENSIONAL DOT MATRIX BARCODE ENCODING AND READING METHODS

CROSS REFERENCE TO RELATED APPLICATIONS

This application is a continuation application of PCT/CN2017/072161, filed on Jan. 23, 2017. The contents of the above-mentioned application are all hereby incorporated by reference.

BACKGROUND OF THE INVENTION

1. Field of the Invention

The present invention relates to the technical field of image identification, and more particularly relates to two-dimensional dot matrix barcode encoding and reading methods.

2. Description of the Prior Art

People read traditional books, newspapers, etc. mainly with eyes. This way of acquiring information is boring, and easily causes visual fatigue over time. Moreover, blind people or people with eye diseases cannot read this traditional publication. To this end, voice reading publications have appeared in recent years, such as the Chinese invention patent with the patent number ZL200610156879.4. For a Multimedia Print Reader (MPR) publication, a two-dimensional barcode voice reading device can be used to decode the content of the voice reading publication to allow a reader to receive audio and video content while reading, which improves the efficiency of reading or memory, and is more convenient for children or those people with visual disability or hearing disability. For an MPR two-dimensional barcode, please see the MPR publication industry standards, including MPR publication Part 1 (Symbology Specification of MPR Code, Standard Number: CY/T58.1-2009), Part 2 (Encoding Rule of MPR Code, Standard Number: CY/T58.2-2009), Part 3 (General Rules of Production, Standard Number: CY/T58.3-2009), Part 4 (Requirements and Inspecting Methods for MPR Code Printing Quality, Standard Number: CY/T58.4-2009), and Part 5 (Basic Management Rules, Standard Number: CY/T58.5-2009).

FIG. 1 is an application schematic diagram of a dot matrix code. The graph-text 101 (such as a pattern "cock" in FIG. 1) and a dot matrix code 102 are printed on a surface 100 of an object such as paper, and 103 is an electronic device having functions of optical image collection and identification. When the electronic device 103 approaches the dot matrix code 102, the electronic device 103 identifies index data stored in the dot matrix code 102, and the electronic device 103 sends the index data to a media playing component (built in the electronic device 103 or independently of the electronic device 103) by wire or wirelessly, and the media playing component retrieves and plays the digital media content (e.g., "cock crow") associated with the graph-text 101 according to the index data. This application is widely used in audio books for young children. With the rapid development of mobile Internet technology, the need for associating all-media content including graphs, texts, audios and videos on the Internet with paper-based textbooks is becoming more and more urgent. For example, online lecture videos of a teacher are associated with paper-based textbooks of students, and the students touch the knowledge point content of the textbooks by the electronic device 103 in wireless or wired connection to a video player to trigger the video player to play the lecture videos of the teacher associated with the knowledge point content. There are massive resources on the Internet, so each associated digital media content must have a unique ID code. If the same ID code is reused, the associated digital media content will be separated into a plurality of independent systems, and content consumers will need to use different reading pens for each independent system. This is a major drawback of the current technical products in the present field. In order to solve this problem, the encoding capacity of a two-dimensional dot matrix barcode must be increased. There are two methods to increase the encoding capacity. The first method is to increase the printing density of code points under the premise of keeping the area of a single two-dimensional dot matrix barcode unchanged, but this will increase the visual interference of the code points on a graph-text, so that the graph-text looks much darker than that by normal printing. The second method is to keep code point spacing constant and increase the area of a single two-dimensional dot matrix barcode, but this will significantly increase the operation amount of image identification and the error rate of code point coordinate positioning.

As shown in FIG. 2, a first known dot matrix code is composed of a first code point group 210 and a second code point group 211 having a data storage function. Since an optical imaging system has a perspective distortion, code points in the second code point group 211 are further away from code points in the first code point group 210 after rows and columns are enlarged, and a center coordinate error of a mesh in the second code point group 211 recovered according to a code point coordinate in the first code point group 210 will also become larger and larger.

As shown in FIG. 3, a second known dot matrix code is an improved version of the dot matrix code shown in FIG. 2. A code point has up to 8 deviation states to store 3 bits of data. On the premise of same number of rows and columns, the dot matrix code shown in FIG. 3 and the dot matrix code shown in FIG. 2 have the same storage capacity, and code points having a coordinate calibration function in FIG. 3 are relatively evenly distributed in a matrix, but an effect that at least one coordinate calibration code point is adjacent to each data storage code point is not achieved.

In summary, a code point configuration form in the prior art cannot be well applied to a large encoding capacity, so it is greatly challenging for engineers and technicians in the field to design a two-dimensional dot matrix barcode encoding method which is large in encoding capacity, adapts to a large optical imaging distortion, has a small visual interference to human eyes and can be simply and reliably identified, and corresponding identification and decoding algorithms.

The above disclosure of the background art is only for assisting in understanding the inventive concept and technical solution of the present invention, and does not necessarily belong to the prior art of the present patent application, and if there is no clear evidence showing that the above content has been disclosed on the filing date of the present patent application, the above background art should not be used to evaluate the novelty and inventiveness of the present application.

SUMMARY OF THE INVENTION

An objective of the present invention is to provide two-dimensional dot matrix barcode encoding and reading methods, intended to solve the technical problems in the prior art of increased operation amount of identification and high error rate of code point positioning caused by the increase of an encoding capacity due to uneven distribution of coordinate calibration code points.

To this end, the present invention provides a two-dimensional dot matrix barcode encoding method, a two-dimensional dot matrix barcode being composed of M×N virtual code point storage blocks, the method including: forming a plurality of coordinate calibration blocks, a plurality of data storage blocks and a direction indication block by filling code points into the virtual code point storage blocks respectively, wherein code points filled in the plurality of coordinate calibration blocks are located in the centers of the virtual code point storage blocks; the direction indication block is filled with at least two code points, only one code point being located in the center of the virtual code point storage block; the plurality of coordinate calibration blocks and the direction indication block are separated from each other and distributed among the plurality of data storage blocks; code points filled in the plurality of data storage blocks are used to store data information; and the plurality of coordinate calibration blocks and the plurality of data storage blocks have only one code point, where M≥4, N≥4, N≥4, and M and N are both even numbers.

According to an embodiment, the encoding method may further include the following technical features: in the two-dimensional dot matrix barcode, the virtual code point storage blocks in which row coordinates and column coordinates are both odd or even are coordinate calibration blocks and the direction indication block, and the remaining virtual code point storage blocks are the data storage blocks.

The plurality of coordinate calibration blocks, the plurality of data storage blocks and a direction indication block are divided into 3×3 sub-blocks by virtual row and column lines respectively, and a central sub-block of each coordinate calibration block is filled with a code point; only one sub-block in each data storage block is filled with a code point, and the data storage block stores different data by filling code points in different sub-blocks; and at least two sub-blocks in the direction indication block are filled with code points.

The code points filled in the direction indication block do not overlap after being rotated by ±90° or 180° around the geometric center thereof.

The present invention also provides a two-dimensional dot matrix barcode reading method, used for identifying a two-dimensional dot matrix barcode obtained by using the method of any of the above, including the following steps of: acquiring a barcode grayscale image not smaller than the size of a two-dimensional dot matrix barcode, the grayscale image including at least one direction indication block and a plurality of coordinate calibration blocks; acquiring row and column positions of the coordinate calibration blocks and the direction indication block in the two-dimensional dot matrix barcode according to the grayscale image including the at least one direction indication block and the plurality of coordinate calibration blocks; and reading data stored in the two-dimensional dot matrix barcode according to the grayscale image and the row and column positions of the coordinate calibration blocks and the direction indication block.

According to an embodiment, the reading method may include the following technical features: Reading data stored in the two-dimensional dot matrix barcode according to the grayscale image and the row and column positions of the coordinate calibration blocks and the direction indication block includes the following steps: S1: performing binarization processing on the grayscale image to obtain a binary image, and marking a code point in the binary image to determine a barycentric coordinate (x, y) of the code point; S2: determining a row direction and a column direction of the code point and row dividing points and column dividing points: determining the row direction and the column direction of the code point by taking the geometric center of the binary image as a rotation center and calculating a mean square error of a projection waveform of the barycentric coordinate of the code point in a predetermined direction at each rotation angle of the binary image, then projecting the barycentric coordinate (x, y) of the code point in the row direction and the column direction, and calculating the row dividing points and the column dividing points for the projection waveform by using an autocorrelation method; S3: rotating and converting the barycentric coordinate (x, y) of the code point according to the row direction and the column direction obtained in step S2, calculating a converted code point coordinate $(x_1, y_1)$ after rotation, and forming, by using the row dividing points and the column dividing points obtained in step S2, a rectangular mesh for dividing the code points; S4: constructing a two-dimensional matrix corresponding to the rectangular mesh obtained in step S3, determining, according to the converted code point coordinate $(x_1, y_1)$, a block in the rectangular mesh to which the converted code point coordinate belongs, and then adding the converted code point coordinate $(x_1, y_1)$ to a unit of the two-dimensional matrix corresponding to the block; S5: identifying a rotation direction and an offset of the two-dimensional matrix according to the unit of the two-dimensional matrix in feature matching with the direction indication block; and S6: reconstructing a complete two-dimensional dot matrix barcode according to the rotation direction and the offset, and reading data stored therein.

The rotation direction of the two-dimensional matrix is calculated according to a relative position between the coordinate calibration block adjacent to the direction indication block and the converted code point coordinate $(x_1, y_1)$, and a relative position among the plurality of code points in the direction indication block.

Reading values stored in the data storage block according to the coordinate calibration block specifically includes: first, calculating a center coordinate of the data storage block according to the converted code point coordinate $(x_1, y_1)$ of the coordinate calibration block; and then, reading stored data according to an offset of the converted code point coordinate $(x_1, y_1)$ relative to the center coordinate in the data storage block.

The center coordinate of the data storage block is calculated by using an interpolation method according to the converted code point coordinate $(x_1, y_1)$ of the coordinate calibration block.

Reconstructing a complete two-dimensional dot matrix barcode includes the following sub-steps:

S601: acquiring correct reference positions of the direction indication block, the coordinate calibration block and the data storage block respectively;

S602: identifying units in feature matching with the direction indication block, the coordinate calibration block and the data storage block in the two-dimensional matrix respectively, and determining relative positions of the units in feature matching with the coordinate calibration block and the data storage block by taking the unit in feature matching with the direction indication block as a position origin;

S603: allowing the position origin to overlap with the correct reference position of the direction indication block, and allowing the relative position of the unit in feature matching with the coordinate calibration block of the two-dimensional matrix to overlap with the correct reference position of the coordinate calibration block; and S604: decomposing the virtual code point storage blocks in the two-dimensional matrix with reference to the correct reference positions, and moving them to correct positions, so as to reconstruct a two-dimensional matrix that is the same as the two-dimensional dot matrix barcode in both row-column number and arrangement.

Compared with the prior art, the present invention includes the beneficial effects that: in the present invention, the coordinate calibration blocks and the direction indication block are evenly distributed among the data storage blocks, so that the problem of printing and visual interference is solved and resistance to optical imaging deformation is improved.

In a preferred solution, the code points filled in the direction indication block have the characteristics of non-overlapping after ±90° and 180° rotation around the geometric center of the direction indication block, so that the rotation direction of an image can be accurately determined, and thus further technical effects of high identification speed and high accuracy are achieved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 is a first flowchart of Embodiment 3 of the present invention.

DETAILED DESCRIPTION

Figure 1:
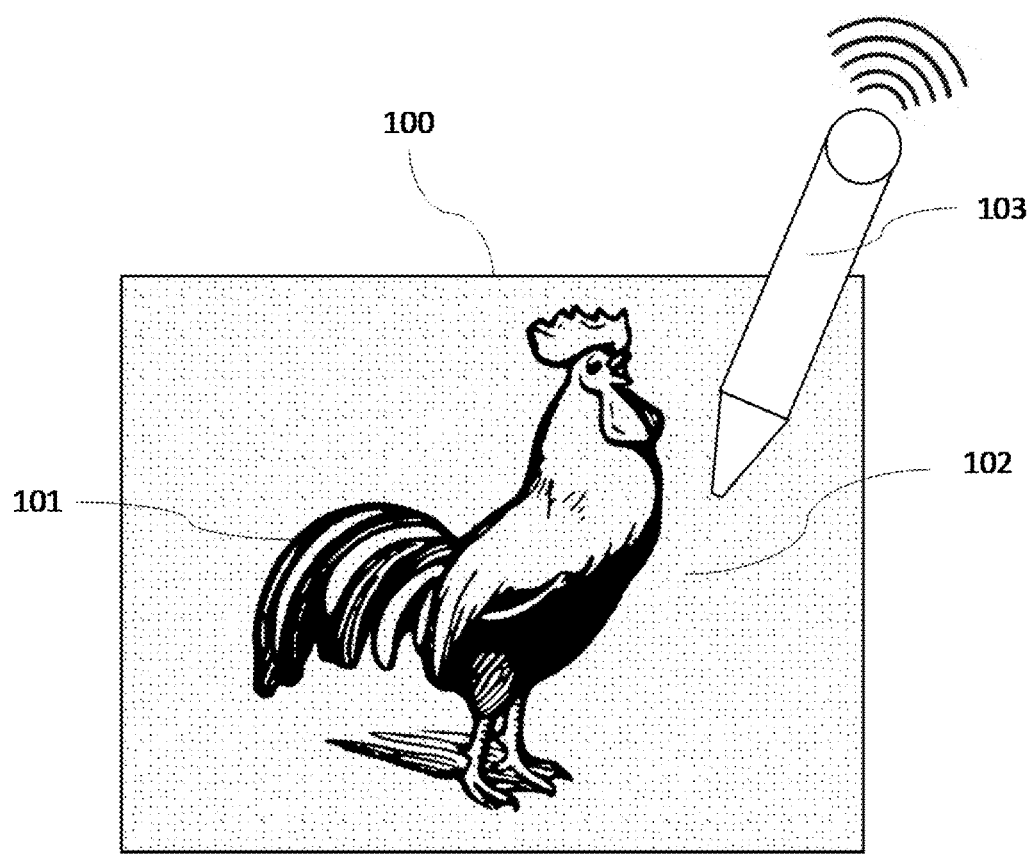
FIG. 1 is an application schematic diagram of a dot matrix code.
Figure 2:
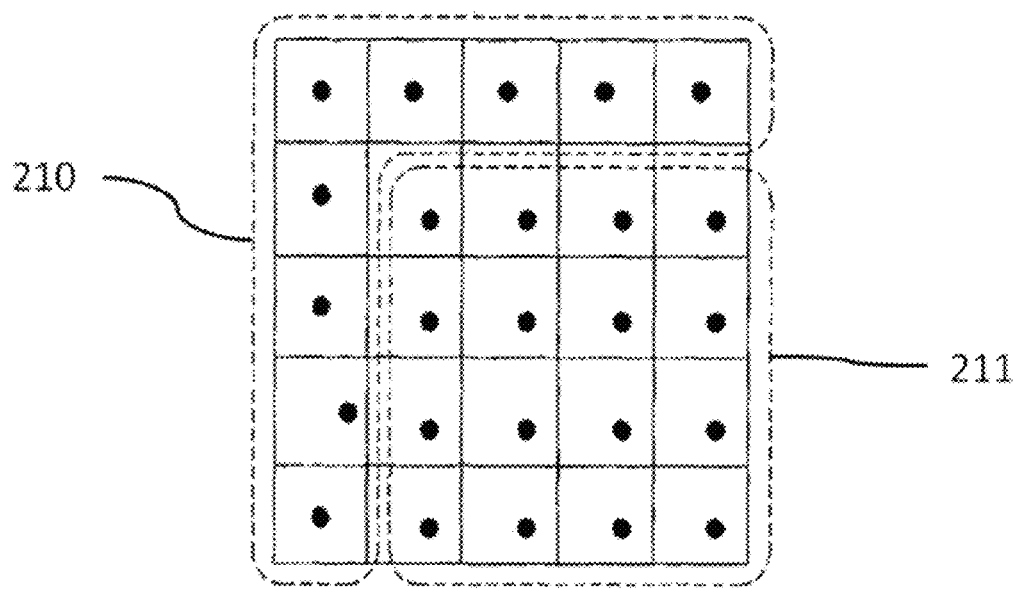
FIG. 2 is a schematic diagram of a first known dot matrix code.
Figure 3:
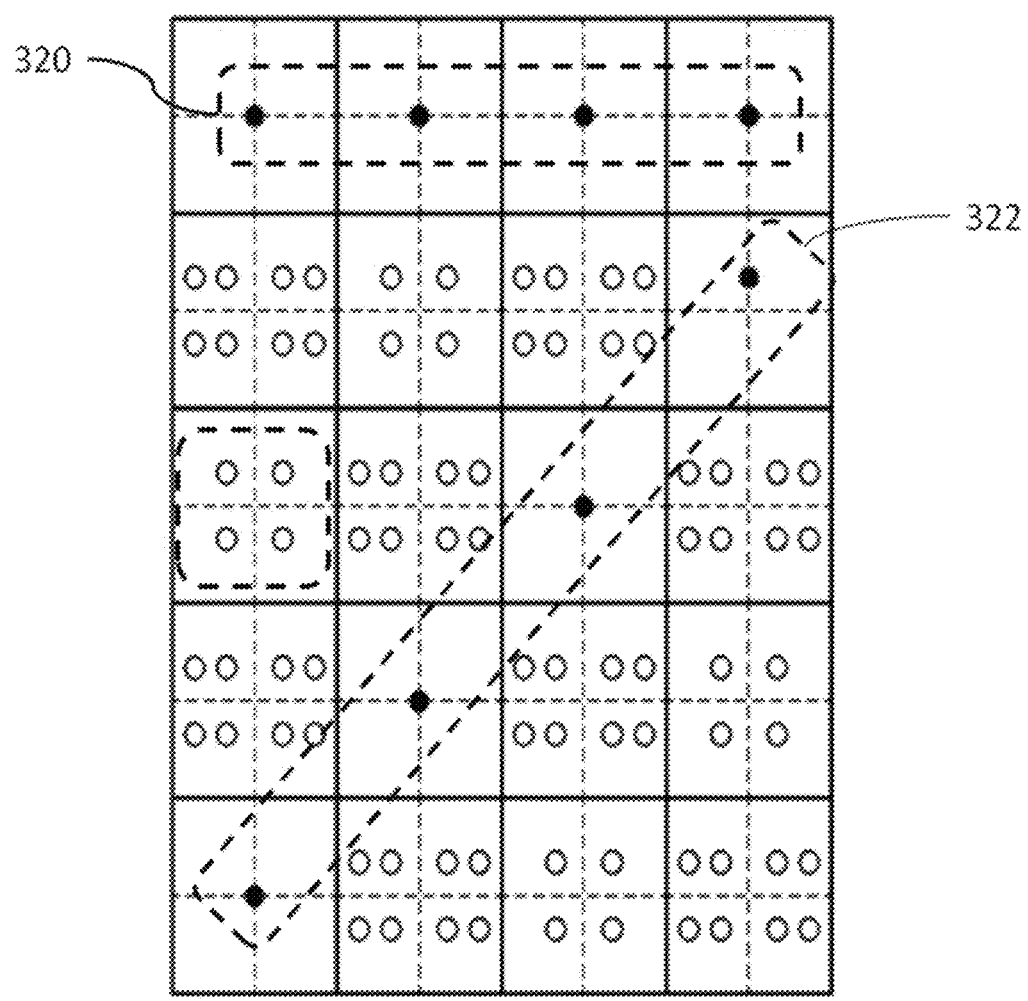
FIG. 3 is a schematic diagram of a second known dot matrix code.
Figure 4:
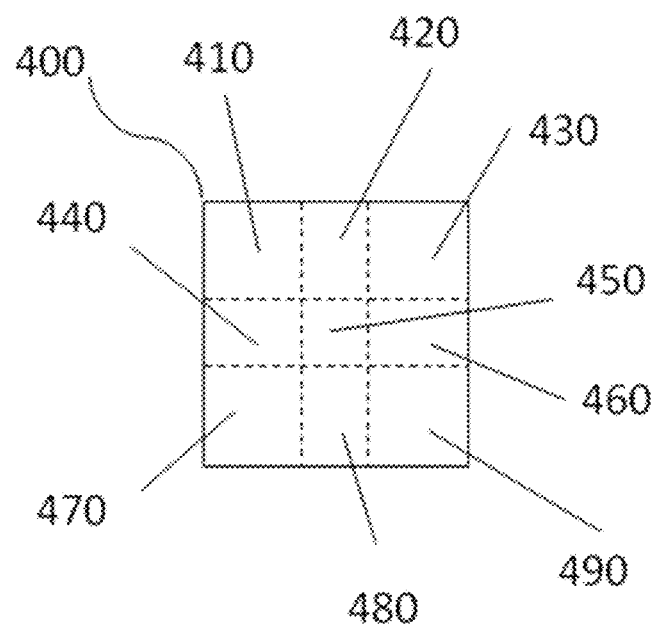
FIG. 4 is a schematic diagram of dividing a virtual code point storage block and a sub-block according to Embodiments 1 and 2 of the present invention.
Figure 5:
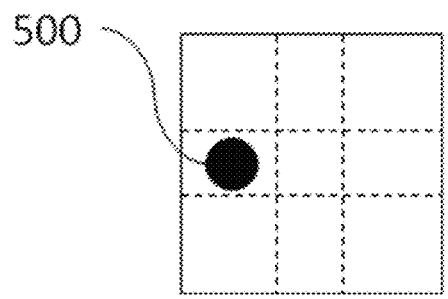
FIG. 5 is a schematic diagram of filling a code point according to Embodiments 1 and 2 of the present invention.
Figure 6:
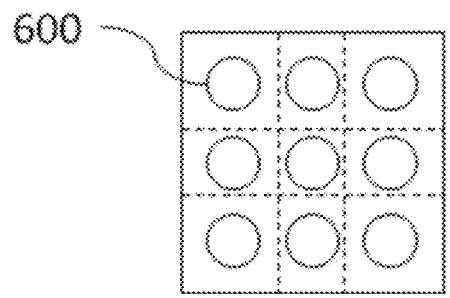
FIG. 6 is a schematic diagram of a sub-block position of a sub-block fillable with a code point according to Embodiments 1 and 2 of the present invention.

The present invention will be further described in detail below in conjunction with the specific implementation modes and with reference to the accompanying drawings. It should be noted that the following description is only illustrative, and is not intended to limit the scope of the present invention and the application thereof.

Non-limitative and non-exclusive embodiments will be described with reference to FIG. 1 to FIG. 31, wherein the same reference numerals refer to the same parts unless otherwise specifically described.

Embodiment 1

As shown in FIG. 4 to FIG. 8, a two-dimensional dot matrix barcode encoding method is provided. A two-dimensional dot matrix barcode 701 is composed of 4×4 virtual code point storage blocks 400. Three coordinate calibration blocks 720, 12 data storage blocks 730 and a direction indication block 710 are formed by filling code points 500 into the virtual code point storage blocks 400 respectively.

Code points filled in the coordinate calibration block are located in the centers of the virtual code point storage blocks.

The direction indication block is filled with two code points, only one code point being located in the center of the virtual code point storage block.

The coordinate calibration blocks and the direction indication block are separated from each other and distributed among the plurality of data storage blocks.

Code points filled in the data storage blocks are used to store data information.

The coordinate calibration blocks and the plurality of data storage blocks have only one code point.

Figure 7:
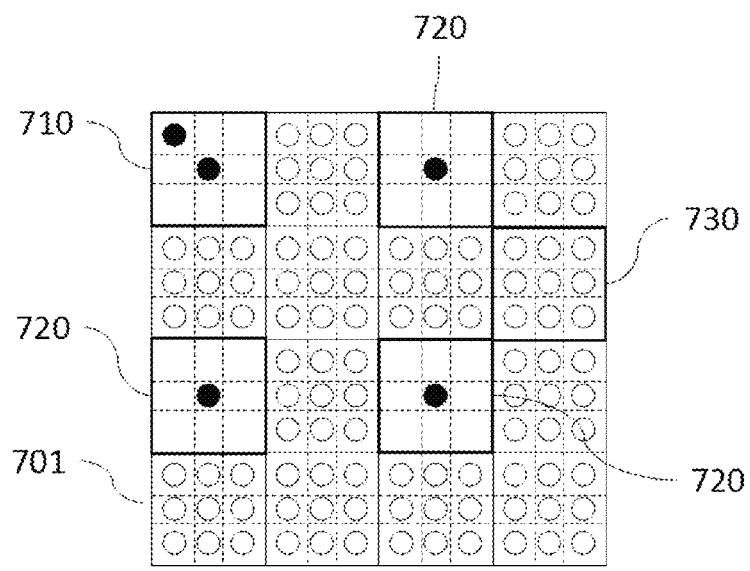
FIG. 7 is a schematic diagram of a 4×4 two-dimensional dot matrix barcode according to Embodiment 1 of the present invention.

In the embodiment, as shown in FIG. 7, in the two-dimensional dot matrix barcode 701, the center of the virtual code point storage block which is located at the upper left is (1, 1), the virtual code point storage blocks of which row coordinates and column coordinates are both odd are the coordinate calibration blocks and the direction indication block, and the remaining virtual code point storage blocks are the data storage blocks.

As shown in FIG. 7, from top to bottom, the virtual code point storage blocks 400 in the fourth row of the two-dimensional dot matrix barcode 701 are the data storage blocks 730; from left to right, the virtual code point storage blocks 400 in the fourth column of the two-dimensional dot matrix barcode 701 are the data storage blocks 730; the virtual code point storage block 400 in the first row and the first column of the two-dimensional dot matrix barcode 701 is the direction indication block 710; except all the virtual code point storage blocks 400 in the fourth row, all the virtual code point storage blocks 400 in the fourth column and the virtual code point storage block 400 in the first row and the first column, the virtual code point storage block 400 of which the coordinates are an odd row and an odd column is the coordinate calibration block 720, and the remaining are the data storage blocks 730; the virtual code point storage block 400 of which the coordinates are an odd row and an even column is the data storage block 730, and the coordinate calibration blocks 720 are disposed at left and right parts adjacent to the data storage block 730 of which the coordinates are an odd row and an even column respectively; the virtual code point storage block 400 of which the coordinates are an even row and an odd column is the data storage block 730, and the coordinate calibration blocks 720 are disposed at upper and lower parts adjacent to the data storage block 730 of which the coordinates are an even row and an odd column respectively; and the virtual code point storage block 400 of which the coordinates are an even row and an even column is the data storage block 730, and the coordinate calibration blocks 720 are disposed at upper left, lower left, upper right and lower right parts adjacent to the data storage block 730 of which the coordinates are an even row and an even column respectively.

The coordinate calibration blocks 720, the data storage blocks 730 and the direction indication block 710 are divided into 3×3 sub-blocks (410-490) by virtual row and column lines respectively. A central sub-block 450 of each coordinate calibration block 720 is filled with a code point 500 for calibrating coordinate. Only one sub-block (410-490) in each data storage block 730 is filled with a code point 500 for storing data. Two sub-blocks in the direction indication block 710 are filled with code points 500, wherein only one code point 500 is located in the sub-block 450 in the center of the virtual code point storage block 400. The code points 500 filled in the coordinate calibration blocks 720 are all located in the sub-blocks 450 in the centers of the virtual code point storage blocks 400. The code point 500 disposed in the sub-block 450 in the center of the direction indication block 710 and the code points 500 in the coordinate calibration blocks 720 have the same function of coordinate calibration, and meanwhile, the code point 500 in the center of the direction indication block 710 cooperates with the other code point 500 disposed in other sub-block (410-440, 460-490) to achieve a function of direction indication. The data storage blocks 730 store different data by filling the code points 500 in different sub-blocks (410-490), and there are nine storage positions 600 according to the number and position of the sub-blocks (410-490).

The two code points 500 of the direction indication block 710 do not overlap after being rotated by ±90° or 180° around the geometric center thereof.

Each data storage block 730 of the two-dimensional dot matrix barcode 701 with four rows and four columns may store a novenary number maximally, the maximum storage capacity of 12 data storage blocks 730 is $\log_2 (9^{12}) > 2^{38}$, that is, 32 bits of ID in 38 bits may be stored, and the remaining 6 bits are used for data checking.

Figure 8:
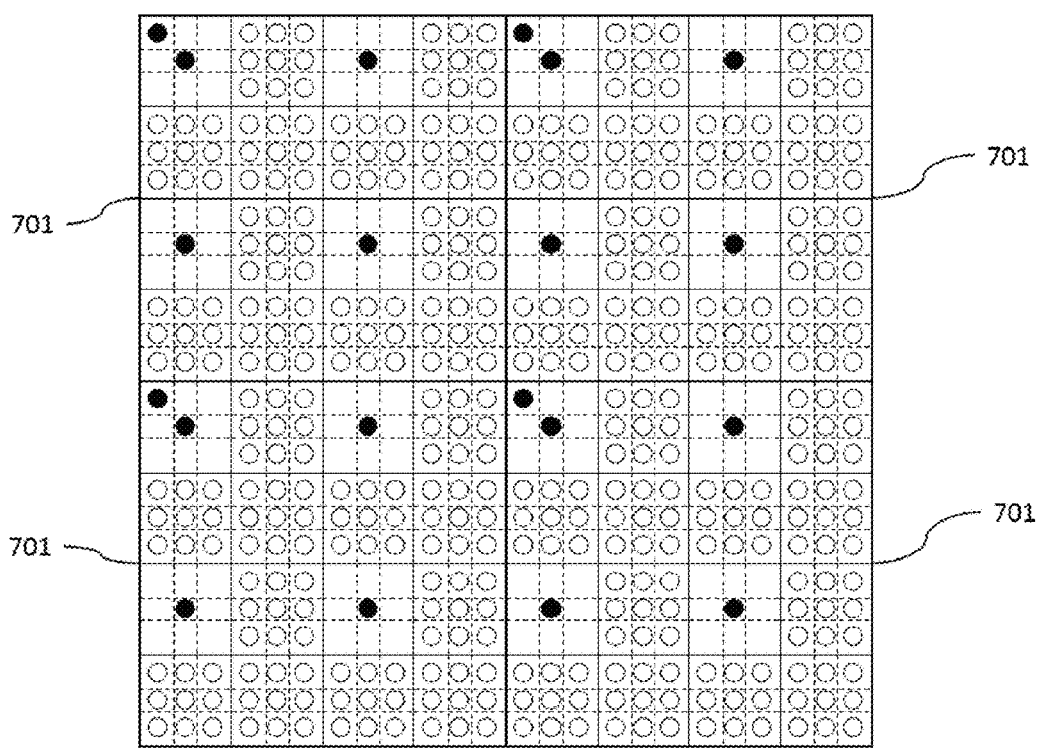
FIG. 8 is a schematic diagram of a tiled splicing barcode including four two-dimensional dot matrix barcodes shown in FIG. 7 according to Embodiment 1 of the present invention.

As shown in FIG. 8, when the two-dimensional dot matrix barcode 701 are tiled and spliced in a row and column manner, all the data storage blocks 730 of the two-dimensional dot matrix barcode 701 in the upper left corner are evenly surrounded by the coordinate calibration blocks 720. Since each data storage block 730 is always accompanied by a pair of left-right or up-down adjacent coordinate calibration blocks 720, or two pairs of diagonally adjacent coordinate calibration blocks 720, the center coordinates can always be calculated by the adjacent coordinate calibration blocks 720 in a fast interpolation manner, thereby reducing the difficulty of identification while ensuring accuracy. Assuming that a printing resolution is 600 DPI and each virtual storage block has 7×7 pixels, the side length of each dot matrix code is (4×7/600×25.4=1.185) mm, the area of a piece of A4 paper is 297×210=62, 370 mm², and approximately INT (297/(4×7/600×25.4))×INT(210/(4×7/600×25.4))=44250 two-dimensional dot matrix barcodes 701 of the present embodiment (INT is a rounding operation) are required for realizing seamless overspreading of a piece of A4 paper.

Embodiment 2

As shown in FIG. 4 to FIG. 6, FIG. 9, and FIG. 10, a two-dimensional dot matrix barcode encoding method is provided. A two-dimensional dot matrix barcode 801 is composed of 6×6 virtual code point storage blocks 400. 8 coordinate calibration blocks 820, 27 data storage blocks 830 and a direction indication block 810 are formed by filling code points 500 into the virtual code point storage blocks 400 respectively.

Code points filled in the coordinate calibration block are located in the centers of the virtual code point storage blocks.

The direction indication block is filled with two code points, only one code point being located in the center of the virtual code point storage block.

The coordinate calibration blocks and the direction indication block are separated from each other and distributed among the plurality of data storage blocks.

Code points filled in the data storage blocks are used to store data information.

The coordinate calibration blocks and the plurality of data storage blocks have only one code point.

Figure 9:
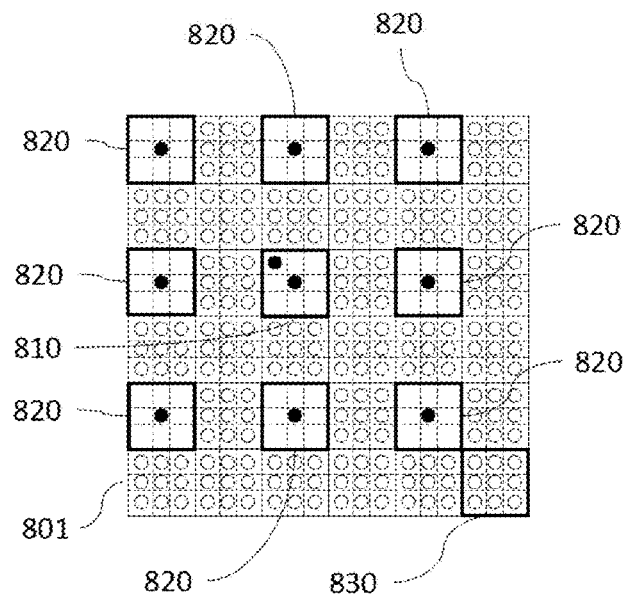
FIG. 9 is a schematic diagram of a 6×6 two-dimensional dot matrix barcode according to Embodiment 2 of the present invention.

In the embodiment, as shown in FIG. 9, in the two-dimensional dot matrix barcode 801, the center of the virtual code point storage block which is located at the upper left is (1, 1), the virtual code point storage blocks of which row coordinates and column coordinates are both odd are the coordinate calibration blocks and the direction indication block, and the remaining virtual code point storage blocks are the data storage blocks.

Specifically as shown in FIG. 9, from top to bottom, the virtual code point storage blocks 400 in the sixth row of the two-dimensional dot matrix barcode 801 are the data storage blocks 830; from left to right, the virtual code point storage blocks 400 in the sixth column of the two-dimensional dot matrix barcode 801 are the data storage blocks 830; the virtual code point storage block 400 in the third row and the third column of the two-dimensional dot matrix barcode 801 is the direction indication block 810; except all the virtual code point storage blocks 400 in the sixth row, all the virtual code point storage blocks 400 in the sixth column and the virtual code point storage block 400 in the third row and the third column, the virtual code point storage block 400 of which the coordinates are an odd row and an odd column is the coordinate calibration block 820, and the remaining are the data storage blocks 830; the virtual code point storage block 400 of which the coordinates are an odd row and an even column is the data storage block 830, and the coordinate calibration blocks 820 are disposed at left and right parts adjacent to the data storage block 830 of which the coordinates are an odd row and an even column respectively; the virtual code point storage block 400 of which the coordinates are an even row and an odd column is the data storage block 830, and the coordinate calibration blocks 820 are disposed at upper and lower parts adjacent to the data storage block 830 of which the coordinates are an even row and an odd column respectively; and the virtual code point storage block 400 of which the coordinates are an even row and an even column is the data storage block 830, and the coordinate calibration blocks 820 are disposed at upper left, lower left, upper right and lower right parts adjacent to the data storage block 830 of which the coordinates are an even row and an even column respectively.

The coordinate calibration blocks 820, the data storage blocks 830 and the direction indication block 810 are divided into 3×3 sub-blocks (410-490) by virtual row and column lines respectively. A central sub-block 450 of each coordinate calibration block 820 is filled with a code point 500 for calibrating coordinate. Only one sub-block (410-490) in each data storage block 830 is filled with a code point 500 for storing data. Two sub-blocks in the direction indication block 810 are filled with code points 500, wherein only one code point 500 is located in the sub-block 450 in the center of the virtual code point storage block 400. The code points 500 filled in the coordinate calibration blocks 820 are all located in the sub-blocks 450 in the centers of the virtual code point storage blocks 400. The code point 500 disposed in the sub-block 450 in the center of the direction indication block 810 and the code points 500 in the coordinate calibration blocks 820 have the same function of coordinate calibration, and meanwhile, the code point 500 in the center of the direction indication block 810 cooperates with the other code point 500 disposed in other sub-block (410-440, 460-490) to achieve a function of direction indication. The data storage blocks 830 store different data by filling the code points 500 in different sub-blocks (410-490), and there are nine storage positions 600 according to the number and position of the sub-blocks (410-490).

The two code points 500 of the direction indication block 810 do not overlap after being rotated by ±90° or 180° around the geometric center thereof.

Each data storage block 830 of the two-dimensional dot matrix barcode 801 with six rows and six columns may store a novenary number maximally, the maximum storage capacity of 27 data storage blocks 830 is $\log_2 (9^{27}) > 2^{85}$, that is, 64 bits of ID in 85 bits may be stored, and the remaining 21 bits are used for data checking.

Figure 10:
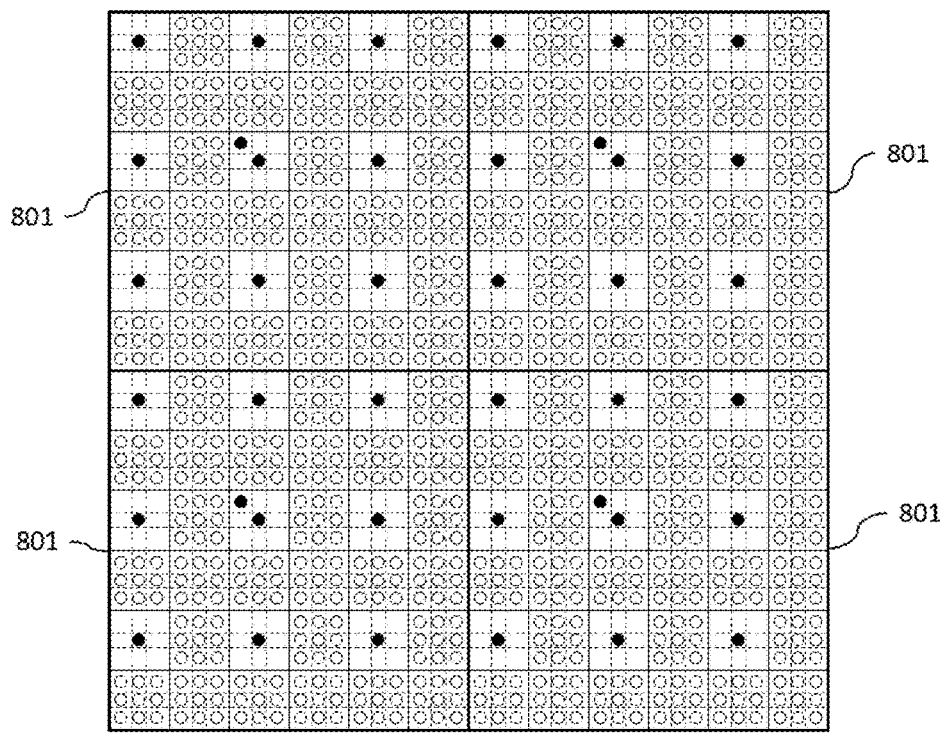
FIG. 10 is a schematic diagram of a tiled splicing barcode including four two-dimensional dot matrix barcodes shown in FIG. 9 according to Embodiment 2 of the present invention.

As shown in FIG. 10, when the two-dimensional dot matrix barcodes 801 are tiled and spliced in a row and column manner, all the data storage blocks 830 of the two-dimensional dot matrix barcode 801 in the upper left corner are evenly surrounded by the coordinate calibration blocks 820. Since each data storage block 830 is always accompanied by a pair of left-right or up-down adjacent coordinate calibration blocks 820, or two pairs of diagonally adjacent coordinate calibration blocks 820, the center coordinates can always be calculated by the adjacent coordinate calibration blocks 820 in a fast interpolation manner, thereby reducing the difficulty of identification while ensuring accuracy.

Embodiment 3

Figure 12:
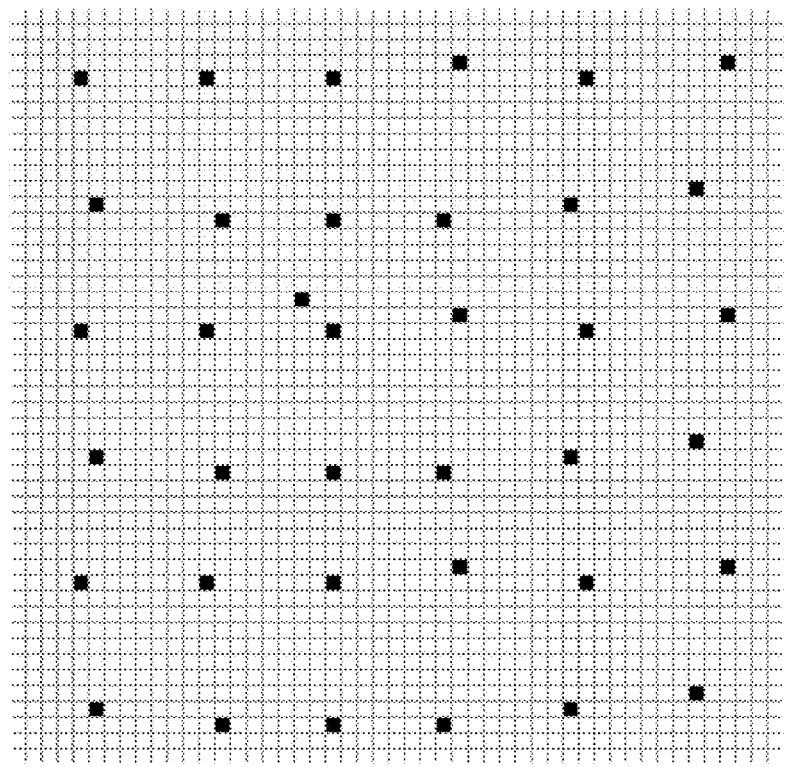
FIG. 12 is a schematic diagram of a two-dimensional dot matrix barcode according to Embodiment 3 of the present invention.

The present embodiment is used to identify the two-dimensional dot matrix barcode 801 described in Embodiment 2. As shown in FIG. 12, it is a two-dimensional dot matrix barcode 801 storing three sets of novenary numbers 0 to 8. Mesh lines in the figure are only used to assist human eyes in observation. Under 600 DPI printing conditions, a two-dimensional dot matrix barcode 801 shown in FIG. 12 occupies an area of about 2 mm×2 mm, a target area readable by an electronic device 103 is usually much larger than the area of a single two-dimensional dot matrix barcode shown in FIG. 12, and each independent readable target area is filled with the same two-dimensional dot matrix barcodes by seamless tiling during printing.

Figure 13:
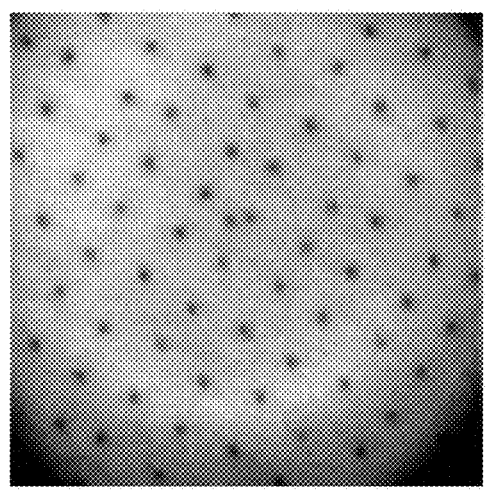
FIG. 13 illustrates a grayscale image of Embodiment 3 of the present invention.

Decoding flow: as shown in FIG. 13, a grayscale image greater than or equal to a two-dimensional dot matrix barcode is acquired, the grayscale image including at least one direction indication block and a plurality of coordinate calibration blocks; coordinate positions of the coordinate calibration block and the direction indication block in the grayscale image are acquired, an optical system of the electronic device 103 usually collects an 8-bit grayscale image, and each pixel ranges from 0 to 255; a matrix code included in FIG. 13 is an image formed by the electronic device 103 relative to the two-dimensional dot matrix barcode 102 in a rotated and tilted state; and the center position of FIG. 12 does not overlap with the center position of FIG. 13, and the tilt also causes the grayscale image to have three dark corners.

As shown in FIG. 11, in the embodiment, the operation of identifying the two-dimensional dot matrix barcode includes the steps as follows.

S1: Binarization processing of the grayscale image is performed to obtain, as shown in FIG. 14, a binary image, and a code point 500 is marked in the binary image to determine a barycentric coordinate (x, y) of the code point.

Figure 14:
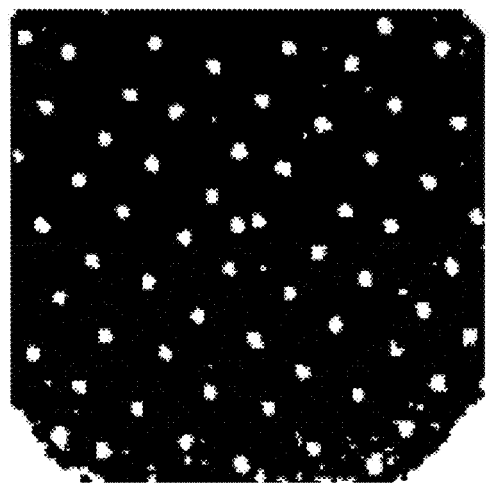
FIG. 14 illustrates a binary image of Embodiment 3 of the present invention.

As shown in the binary image of FIG. 14, the background is a black pixel, the code point 500 and a noise point are white pixels, the white and connected pixels are marked with the same value, an x-coordinate average value and a y-coordinate average value are calculated for the pixels having the same mark value respectively to obtain the barycentric coordinate (x, y) of each code point, the number of pixels of each code point 500 is counted, and the average number of pixels of all code points 500 is calculated, wherein the code points 500 of which the number of pixels is less than half of the average value or 1.5 times greater than the average value are discarded because they are usually noise points.

S2: A row direction and a column direction of the code point 500 are determined. The geometric center of the binary image is taken as a rotation center, the row direction and the column direction of the code point 500 are determined by calculating a mean square error of a projection waveform of the barycentric coordinate of the code point in a predetermined direction at each rotation angle of the binary image, then the barycentric coordinate (x, y) of the code point is projected in the row direction and the column direction respectively, and row dividing points and column dividing points are calculated for the projection waveform by using an autocorrelation method.

Figure 15:
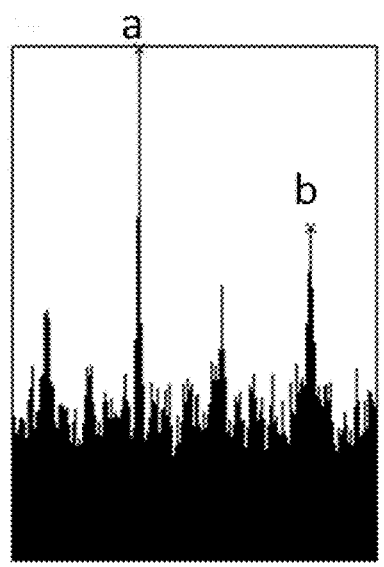
FIG. 15 is a diagram showing a mean square error of a projection waveform according to Embodiment 3 of the present invention.
Figure 16:
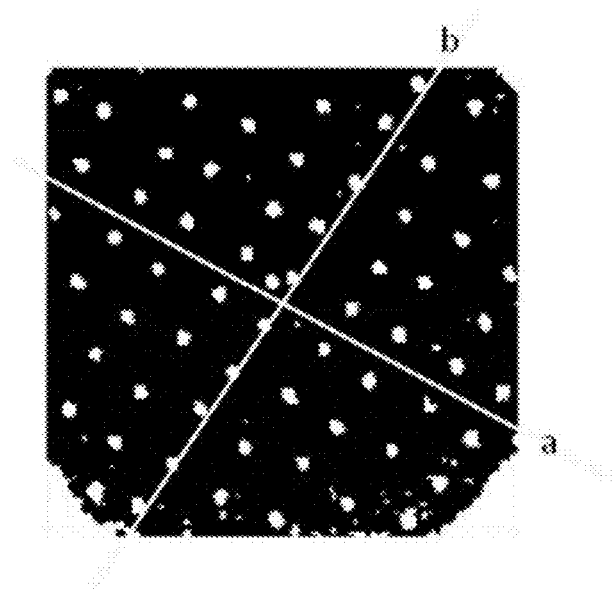
FIG. 16 is a schematic diagram of a row direction and a column direction according to Embodiment 3 of the present invention.

In the embodiment, the operation of determining a row direction and a column direction of the code point 500 is specifically as follows:

Since the coordinates of each code point 500 are offset from a reference code point 500 in an array of code points 500 aligned in rows and columns, it can be understood that a two-dimensional fundamental signal of one period is modulated, after modulation, high-frequency harmonics are introduced, but the fundamental frequency of the signal is constant, so the projections of the center of gravity of the code point in the row direction and the column direction parallel to the dot matrix code present the strongest periodicity. Therefore, the row direction and the column direction of the code point 500 may be determined by calculating a mean square error of a projection waveform of the barycentric coordinate of the code point in a certain fixed direction (e.g., a column direction perpendicular to an image) at each rotation angle waveform. As shown in FIG. 15, the horizontal axis indicates the rotation angles of the barycentric coordinate (x, y) of the code point relative to the center point of FIG. 14, the vertical axis indicates mean square errors of projections of the barycentric coordinate of the code point, a rotation angle corresponding to a maximum peak is defined to be representative of the row direction of the two-dimensional dot matrix barcode, and a rotation angle b corresponding to a peak near an offset for 90° is defined to be representative of the column direction of the two-dimensional dot matrix barcode. As shown in FIG. 16, indication lines representative of the row direction and the column direction are drawn on a black and white image. It should be noted that the row direction and the column direction obtained by this step may be rotated by 90° or 180° or 270° compared with the row direction and the column direction of FIG. 12, but the subsequent decoding process is not affected because the direction may be modified by a direction indication function of the direction indication block.

Figure 17A:
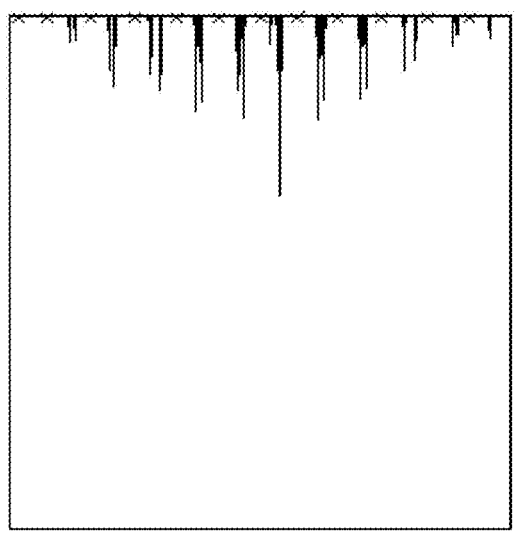
FIG. 17A and FIG. 17B are diagrams of a projection waveform in a row direction and a column direction according to Embodiment 3 of the present invention, respectively.
Figure 17B:
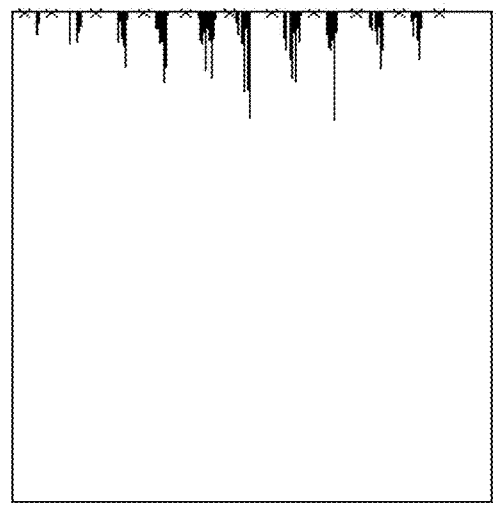

In the embodiment, the barycentric coordinate (x, y) of the code point is respectively projected in the row direction and the column direction, and row dividing points and column dividing points are calculated by using an autocorrelation method for projection results in the row direction and the column direction respectively as follows:

The FIG. 17A and FIG. 17B illustrate projections in the row direction and the column direction respectively. It may be observed visually that projection in the row direction presents the same periodicity as row spacing, and the projection in the column direction presents the same periodicity as column spacing. The autocorrelation algorithm is used to determine respective periods Tr and Tc for the two projection waveforms, Tr is the row spacing, and Tc is the column spacing. The maximum value of the projection waveform in the row direction is used as a reference, and the row dividing points are generated by taking Tr as a step length. The maximum value of the projection waveform in the column direction is used as a reference, and the column dividing points are generated by taking Tc as a step length. In FIG. 17, the part marked with "x" in the horizontal axis is a division point.

S3: The barycentric coordinate (x, y) of the code point is rotated and converted according to the row direction and the column direction obtained in step S2, an converted code point coordinate ($x_1$, $y_1$) after rotation is calculated, and, a rectangular mesh is formed by using the row dividing points and the column dividing points obtained in step S2 for dividing the code points 500.

In the embodiment, the operation of rotating and converting the barycentric coordinate (x, y) of the code point obtained in step S1 according to the row direction and the column direction obtained in step S2, calculating an converted code point coordinate ($x_1$, $y_1$) after rotation according to the barycentric coordinate (x, y) of the code point, and forming, by using the row dividing points and the column dividing points obtained in step S2, a rectangular mesh for dividing the code points 500 is specifically as follows:

The barycentric coordinate of the code point is converted, a coordinate transformation formula being:

$$x_1 = x^*\cos(\alpha) - y^*\sin(\alpha);$$

$$y_1 = x^*\cos(\beta) - y^*\sin(\beta);$$

α is a rotation angle of a dot matrix code in a row direction in FIG. 14, β is a rotation angle of the dot matrix code in a column direction in FIG. 14, and an origin of rotation is the center of FIG. 14.

Figure 18:
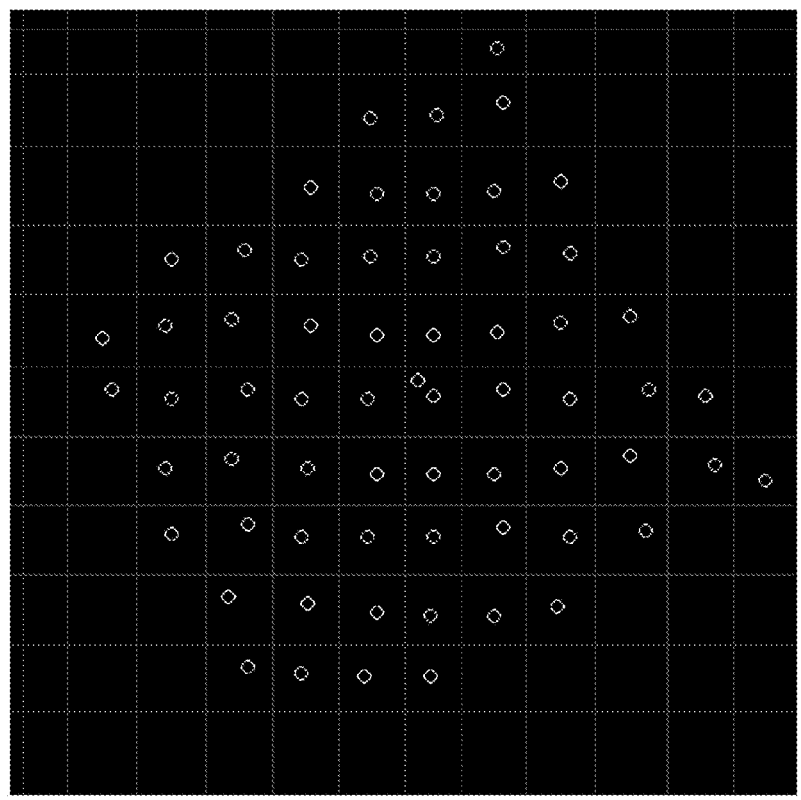
FIG. 18 is a schematic diagram of a result after a rotation operation according to Embodiment 3 of the present invention.

FIG. 18 is a schematic diagram of a result after a rotation operation. The center of each circle in the figure corresponds to a barycentric coordinate of a code point, and mesh lines in the figure are drawn according to the row dividing points and column dividing points calculated in step S2, wherein the mesh lines in a vertical direction are drawn according to the row dividing points, and the mesh lines in a horizontal direction are drawn according to the column dividing points. As can be seen intuitively from FIG. 18, each code point 500 falls within a rectangular block mesh, and a mesh including two code points 500 clearly corresponds to the direction indication block. It should be noted that parallel lines constituting the mesh lines are not accurately and evenly distributed, which does not affect the subsequent decoding process, because the offset of the data code point 500 is calculated subsequently with reference to the code point coordinates in the coordinate calibration block, instead of the mesh lines.

S4: A two-dimensional matrix corresponding to the rectangular mesh obtained in step S3 is constructed, a block in the rectangular mesh to which the converted code point coordinate ($x_1$, $y_1$) belongs is determined according to the converted code point coordinate ($x_1$, $y_1$), and then the converted code point coordinate ($x_1$, $y_1$) is added to a unit of the two-dimensional matrix corresponding to the block.

In the embodiment, a two-dimensional matrix R corresponding to the rectangular mesh formed by dividing the code points 500 in step S3 is constructed, each unit of the matrix corresponds to a rectangular block in FIG. 18, and the subsequent decoding processes are all performed based on the two-dimensional matrix R.

It should be noted that the unit of the two-dimensional matrix R can store the coordinates of two code points 500 at most, because the direction indication block includes two code points 500. For example, the mesh in the seventh row and the eighth column in FIG. 18 includes two code points 500.

S5: A rotation direction of the two-dimensional matrix is identified according to the unit of the two-dimensional matrix in feature matching with the direction indication block, and values stored in the data storage blocks are read according to the coordinate calibration blocks.

Figure 19:
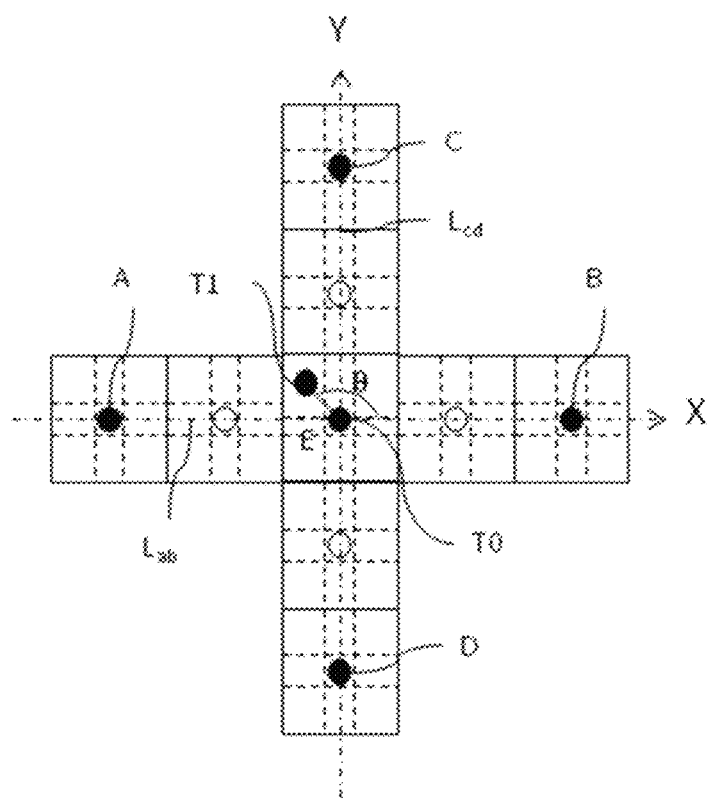
FIG. 19 is a schematic diagram of determining a rotation direction according to Embodiment 3 of the present invention.

In the embodiment, the step of identifying a rotation direction of the two-dimensional matrix R according to the unit of the two-dimensional matrix R in feature matching with the direction indication block and reading values stored in the data storage blocks according to the coordinate calibration blocks is specifically as follows:

A unit having two code point coordinates is found in the two-dimensional matrix R, which corresponds to the direction indication block, and the rotation direction of the direction indication block is calculated according to the code point coordinates. In general, in order to ensure the smoothness of a user operation, the area of an image capturing port of the electronic device 103 ensures that it may cover more than one two-dimensional dot matrix barcode of FIG. 12, the code points 500 included in each frame of digital image captured by the corresponding electronic device 103 may at least reconstruct a complete dot matrix code of FIG. 12, and the constructed two-dimensional matrix R includes at least one direction indication block. As shown in FIG. 19, the rectangular block where the code points T0 and T1 are located is a direction indication block, the rectangular blocks where the corresponding code points A, B, C, and D are located are coordinate calibration blocks, and the method for calculating the rotation direction of a two-dimensional dot matrix barcode according to T0 and T1 is as follows.

A converted code point coordinate E ($x_e$, $y_e$) of a center point E of the coordinate calibration block is calculated: if a code point A ($x_a$, $y_a$) and a code point B ($x_b$, $y_b$) exist simultaneously, E is a midpoint of a line segment Lab, that is, E ($x_e$, $y_e$)=(($x_a+x_b$)/2, ($y_a+y_b$)/2); otherwise, it is judged whether a code point C ($x_c$, $y_c$) and a code point D ($x_d$, $y_d$) exist simultaneously, if the code point C ($x_c$, $y_c$) and the code point D ($x_d$, $y_d$) exist simultaneously, E is a midpoint of a line segment Lcd, that is, E ($x_e$, $y_e$)=(($x_a+x_b$)/2, ($y_c+y_d$)/2); otherwise, two coordinate points T0 and T1 are discarded, and a unit having two code point coordinates is searched again.

A distance D0 from T0 to E is calculated, and a distance D1 from T1 to E is calculated. If D0<D1, T0 is a center point of the direction indication block, which has a coordinate calibration function, otherwise the coordinate values of T0 and T1 are exchanged.

The coordinates of T1 and T0 are known, and an inverse trigonometric function is used to calculate an angle θ, where φ is a preset error allowable value.

If θ∈[135°−φ, 135°+φ], it is considered that the two-dimensional matrix R is rotated by 0° with respect to an original two-dimensional dot matrix barcode.

If θ∈[45°−φ, 45°+φ], it is considered that the two-dimensional matrix R is rotated by 90° with respect to the original two-dimensional dot matrix barcode.

If θ∈[315°−φ, 315°+φ], it is considered that the two-dimensional matrix R is rotated by 180° with respect to the original two-dimensional dot matrix barcode.

If θ∈[225°−φ, 225°+φ], it is considered that the two-dimensional matrix R is rotated by 270° with respect to the original two-dimensional dot matrix barcode.

Otherwise, the two coordinate points T0 and T1 are discarded, and a unit having two code point coordinates is searched again.

Figure 20:
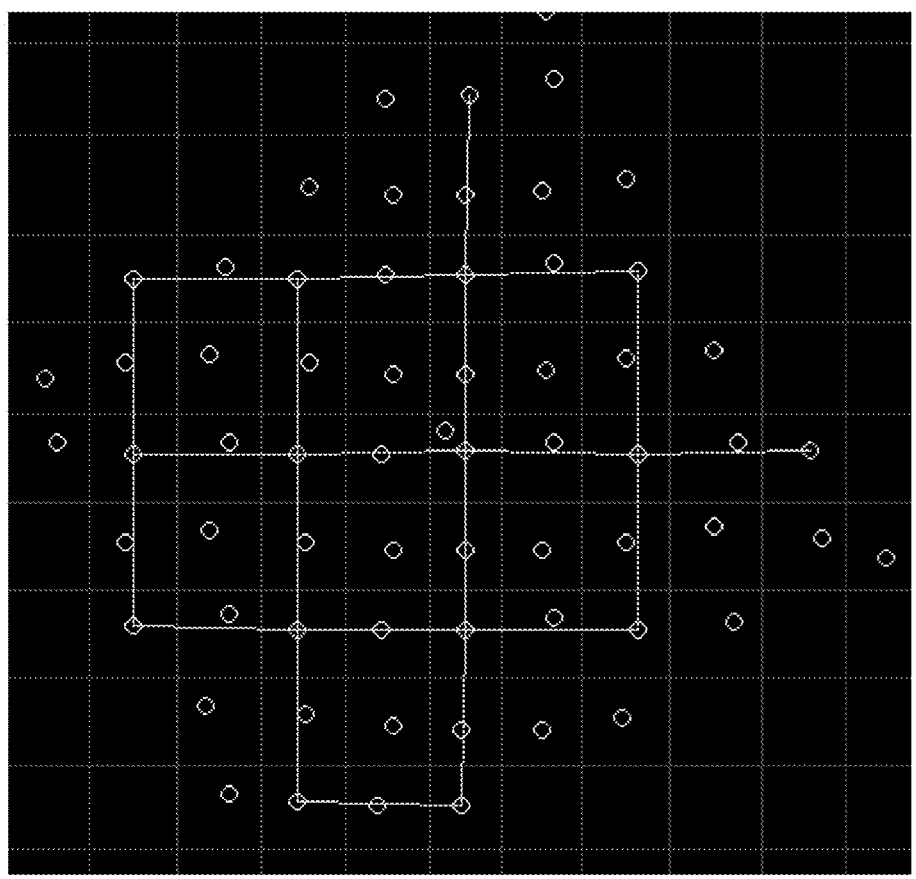
FIG. 20 is a schematic diagram showing a connection effect of code points in adjacent coordinate calibration rectangular blocks according to Embodiment 3 of the present invention.

The center coordinate of the data storage block is calculated by an interpolation algorithm according to the code point coordinates of the coordinate calibration block, and the stored data is read according to the offset of the code point relative to the center coordinate: when the direction indication block is determined, the coordinate calibration blocks are also determined, the effect of connecting code points in adjacent coordinate calibration blocks is shown in FIG. 20, it can be intuitively seen that the code points in the coordinate calibration blocks form an approximately square mesh, and therefore, they can make good use of the function of coordinate calibration. After the coordinate calibration blocks are determined, the center coordinate of the data storage block can be calculated by a simple linear interpolation method according to the code point coordinates in the adjacent coordinate calibration blocks.

Figure 21:
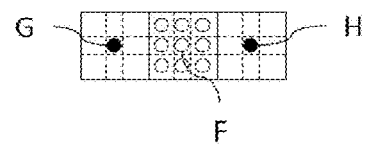
FIG. 21 is a first schematic diagram of determining a center coordinate of a data storage block according to Embodiment 3 of the present invention.

First, it is judged whether coordinate calibration code points adjacent in left and right exist. As shown in FIG. 21, if G and H exist, the center coordinate of the data storage block is F=(G+H)/2.

Figure 22:
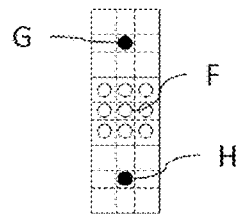
FIG. 22 is a second schematic diagram of determining a center coordinate of a data storage block according to Embodiment 3 of the present invention.

Otherwise, it is judged whether coordinate calibration code points adjacent in up and down exist. As shown in FIG. 22, if G and H exist, the center coordinate of the data storage block is F=(G+H)/2.

Figure 23:
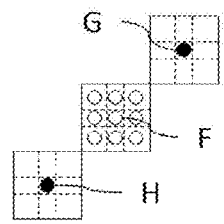
FIG. 23 is a third schematic diagram of determining a center coordinate of a data storage block according to Embodiment 3 of the present invention.

Otherwise, it is judged whether coordinate calibration code points adjacent in lower left and upper right exist. As shown in FIG. 23, if G and H exist, the center coordinate of the data storage block is F=(G+H)/2.

Figure 24:
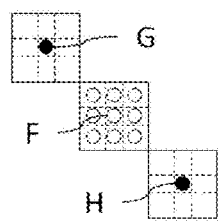
FIG. 24 is a fourth schematic diagram of determining a center coordinate of a data storage block according to Embodiment 3 of the present invention.

Otherwise, it is judged whether coordinate calibration code points adjacent in upper right and lower left exist. As shown in FIG. 24, if G and H exist, the center coordinate of the data storage block is F=(G+H)/2.

Figure 25:
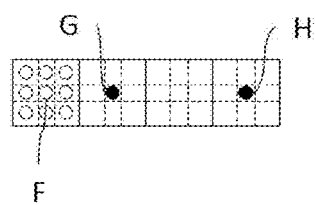
FIG. 25 is a fifth schematic diagram of determining a center coordinate of a data storage block according to Embodiment 3 of the present invention.

Otherwise, it is judged whether two coordinate calibration code points most adjacent on the left side of the same row exist. As shown in FIG. 25, if G and H exist, the center coordinate of the data storage block is F=G+(G−H)/2.

Figure 26:
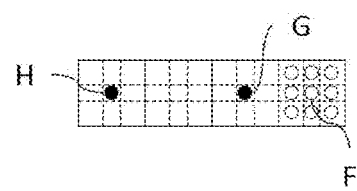
FIG. 26 is a sixth schematic diagram of determining a center coordinate of a data storage block according to Embodiment 3 of the present invention.

Otherwise, it is judged whether two coordinate calibration code points most adjacent on the right side of the same row exist. As shown in FIG. 26, if G and H exist, the center coordinate of the data storage block is F=G+(G−H)/2.

Figure 27:
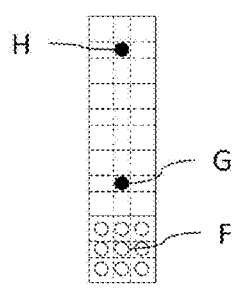
FIG. 27 is a seventh schematic diagram of determining a center coordinate of a data storage block according to Embodiment 3 of the present invention.

Otherwise, it is judged whether two coordinate calibration code points most adjacent on the upper side of the same row exist. As shown in FIG. 27, if G and H exist, the center coordinate of the data storage block is F=G+(G−H)/2.

Figure 28:
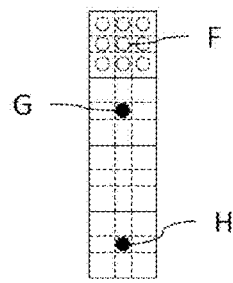
FIG. 28 is an eighth schematic diagram of determining a center coordinate of a data storage block according to Embodiment 3 of the present invention.

Otherwise, it is judged whether two coordinate calibration code points most adjacent on the lower side of the same row exist. As shown in FIG. 28, if G and H exist, the center coordinate of the data storage block is F=G+(G−H)/2.

If none of the above conditions are met, the code point 500 is discarded.

Figure 29:
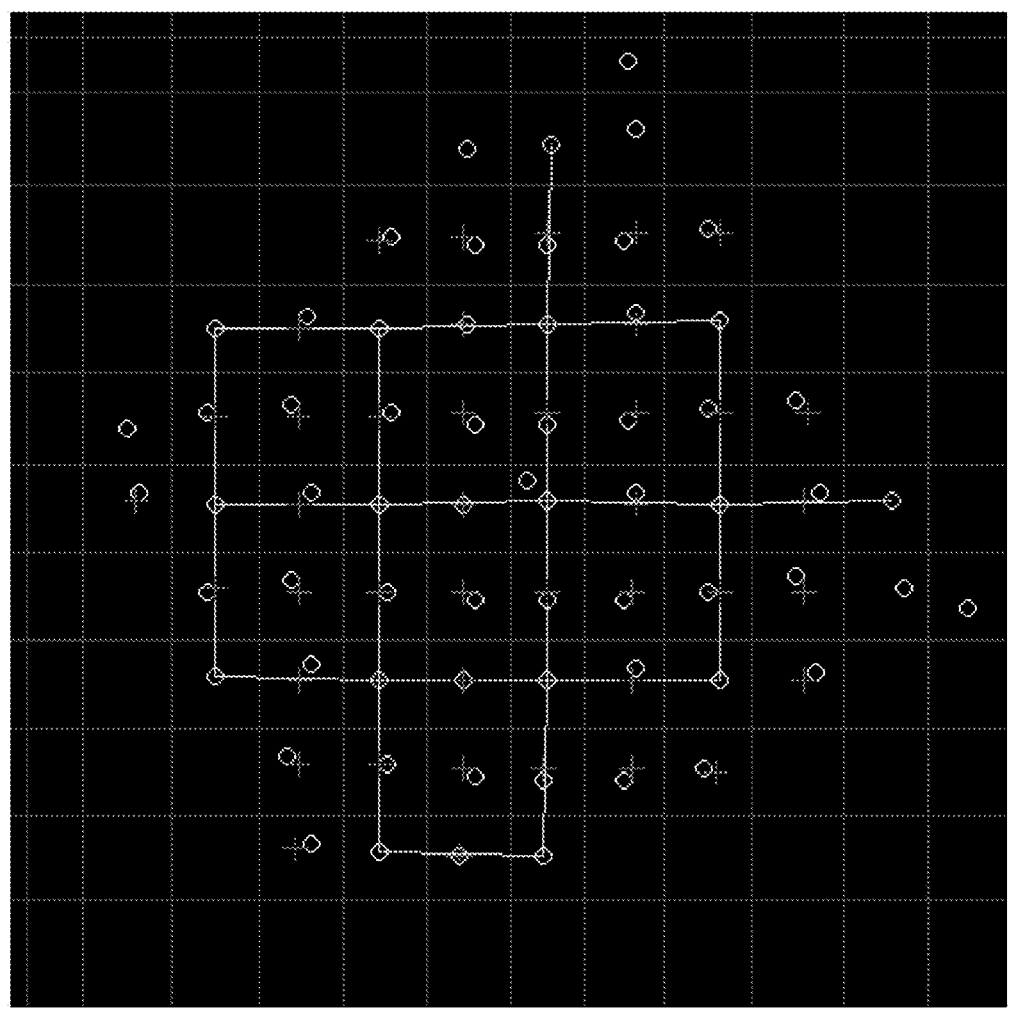
FIG. 29 is a schematic diagram of a center coordinate of a data storage block according to Embodiment 3 of the present invention.
Figure 30:
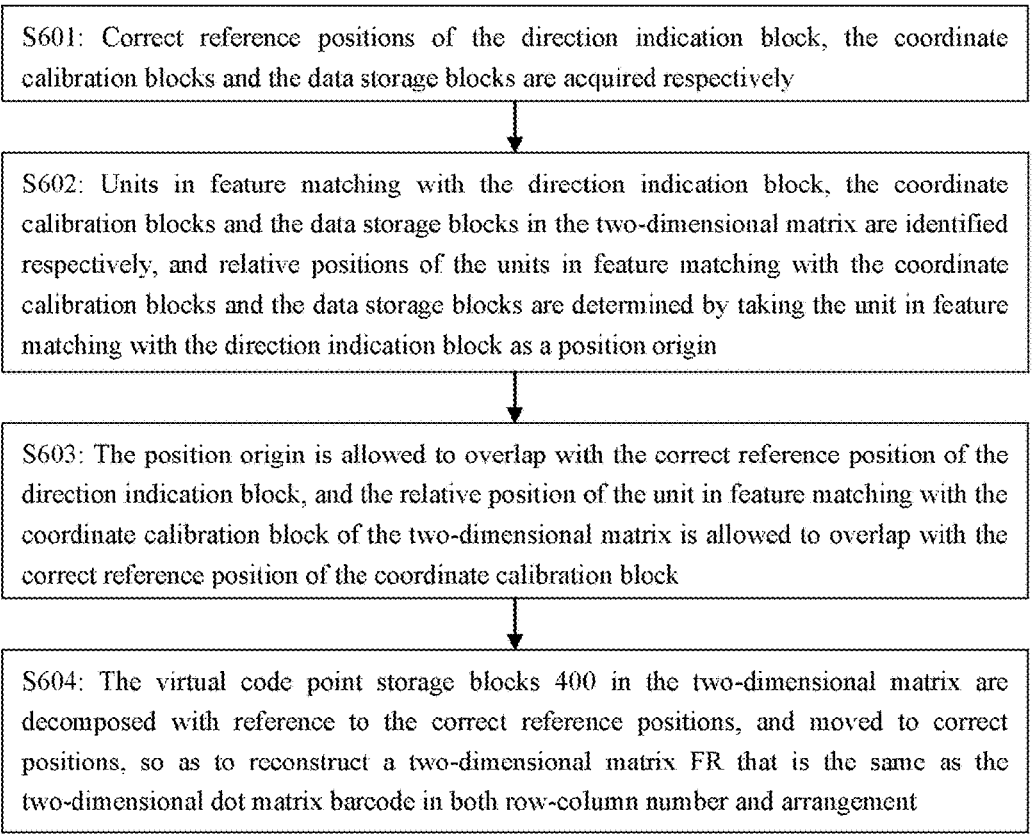
FIG. 30 is a second flowchart of Embodiment 3 of the present invention.

In FIG. 29, each "cross" symbol is drawn according to the center coordinate of the data storage block calculated by the above interpolation method, and the offset mode of the data code point relative to the center coordinate of the data storage block can be visually seen from this figure.

For each data code point I ($x_i$, $y_i$) in FIG. 29, an offset reference point is defined as F ($x_f$, $y_f$), that is, a "+" sign in FIG. 28; assuming that a tolerated maximum error of the coordinate calculation is e, a normalized horizontal offset is calculated as HS=INT(($x_i-x_f$)/e), where INT is a rounding operation; if HS<−1, HS=−1; if HS>1, HS=1; a normalized vertical offset is calculated as VS=INT(($y_i-y_f$)/e); if VS<−1, VS=−1; and if VS>1, VS=1. Thus, there are nine combinations of values of (HS, VS), corresponding to the stored novenary number 0 to 8, the detailed correspondence being listed in Table 1 below:

TABLE 1

| Offset mode (HS, VS) | Novenary number |
| --- | --- |
| (0, 0) | 0 |
| (0, −1) | 1 |
| (+1, −1) | 2 |
| (+1, 0) | 3 |
| (+1, +1) | 4 |
| (0, +1) | 5 |
| (−1, +1) | 6 |
| (−1, 0) | 7 |
| (−1, −1) | 8 |

It should be noted that if the code point matrix in FIG. 29 is rotated with respect to FIG. 12, it is necessary to modify the novenary number in the above table according to the rotation direction.

S6: A complete two-dimensional dot matrix barcode is reconstructed according to the rotation direction and the offset, and data stored therein are read.

Figure 31:
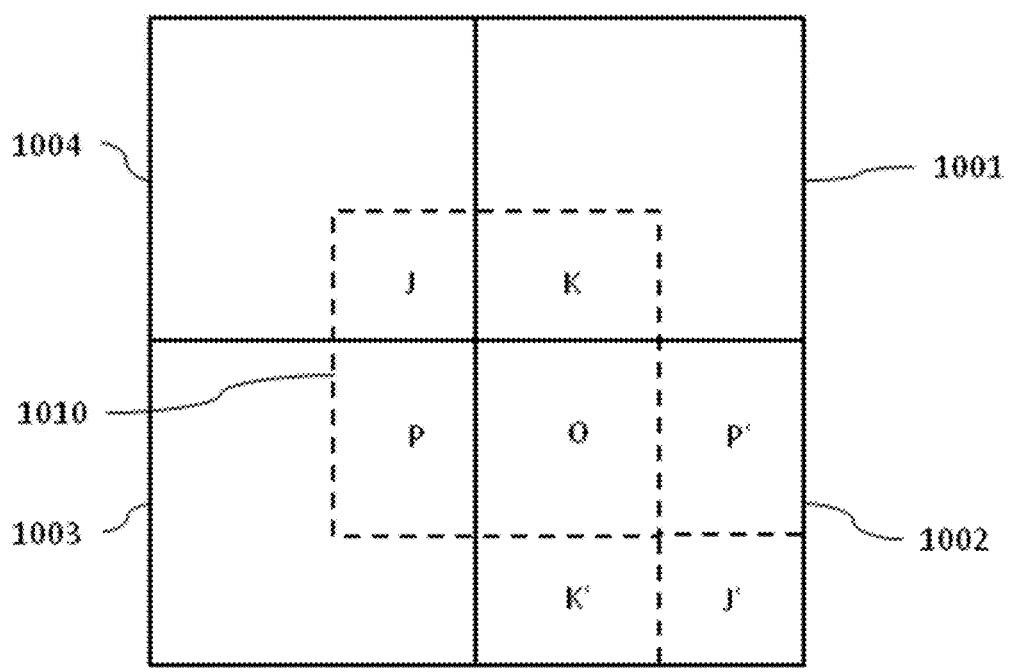
FIG. 31 is a schematic diagram of reconstructing a two-dimensional dot matrix barcode according to Embodiment 3 of the present invention.

In the embodiment, as shown in FIG. 31, the operation of reconstructing a complete two-dimensional dot matrix barcode includes the sub-steps as follows.

S601: Correct reference positions of the direction indication block, the coordinate calibration blocks and the data storage blocks are acquired respectively.

S602: Units in feature matching with the direction indication block, the coordinate calibration blocks and the data storage blocks in the two-dimensional matrix are identified respectively, and relative positions of the units in feature matching with the coordinate calibration blocks and the data storage blocks are determined by taking the unit in feature matching with the direction indication block as a position origin.

S603: The position origin is allowed to overlap with the correct reference position of the direction indication block, and the relative position of the unit in feature matching with the coordinate calibration block of the two-dimensional matrix is allowed to overlap with the correct reference position of the coordinate calibration block.

S604: The virtual code point storage blocks 400 in the two-dimensional matrix are decomposed with reference to the correct reference positions, and moved to correct positions, so as to reconstruct a two-dimensional matrix FR that is the same as the two-dimensional dot matrix barcode in both row-column number and arrangement.

As shown in FIG. 29, it does not directly contain a complete two-dimensional dot matrix barcode, but a complete two-dimensional dot matrix barcode may be reconstructed with all of its code points 500. To visually illustrate the reconstruction method, please see FIG. 31. As shown in FIGS. 31, 1001, 1002, 1003, and 1004 each represent a complete two-dimensional dot matrix barcode having the same content, and they are seamlessly spliced. The area 1010 is an effective image acquisition area of the electronic device 103, although the area 1010 does not completely cover any one of the two-dimensional dot matrix barcodes 1001 to 1004, it can be seen intuitively from the figure that if a block J is moved to J', a block K is moved to K' and a block P is moved to P', the four blocks O, K', J', and P' reconstruct a complete block 1002.

It should be noted that a check or forward error correction algorithm may be used to generate check data before the two-dimensional dot matrix barcode is generated, and the check data is stored together to the two-dimensional dot matrix barcode (the embodiment is convenient for reading comprehension, and no check data is used). If the data stored in the two-dimensional dot matrix barcodes 1001 to 1004 are different, the reconstructed dot matrix code will not be an effective dot matrix code, and the electronic device 103 will refuse to make identification because the data check fails. This occurs when the electronic device 103 reads a joint between the two readable target areas. The area of the joints of different targets occupies a small proportion of the area of the entire readable area, and the probability of reading in actual operation is low, so it does not affect the user's use.

A 6×6 two-dimensional matrix FR for storing a target result is constructed, and the value stored in the code point of the $U^{th}$ row and the $V^{th}$ column in FIG. 29 is filled into the $W^{th}$ row and the $Z^{th}$ column in the two-dimensional matrix FR, an operation relationship between (W, Z) and (U, V) being as follows:

If FIG. 29 is not rotated with respect to FIG. 12,
W=(V−origin_col+18) mod 6;
Z=(U−origin_row+18) mod 6.

If FIG. 29 is rotated by 90° with respect to FIG. 12,
W=(U−origin_row+18) mod 6;
Z=(6−(V−origin_col)+18) mod 6.

If FIG. 29 is rotated by 180° with respect to FIG. 12,
W=(6−(V−origin_col)+18) mod 6;
Z=(6−(U−origin_row)+18) mod 6.

If FIG. 29 is rotated by 270° with respect to FIG. 12,
W=(6−(V−origin_row)+18) mod 6;
Z=(V−origin_col+18) mod 6.

In the above four groups of formulas, mod is the modulo operation, +18 ensures that the number of modulo is a positive number, and (origin_row, origin_col) is origin_row and column coordinates of the dot matrix code, that is, the row and column coordinates of the direction indication block are reduced by 2 respectively. In FIG. 29, the direction indication block is located in the seventh row and the eighth column (the mesh at the top left corner is defined as the first row and the first column), and the rotation angle of FIG. 29 with respect to FIG. 12 is 0, so origin_row=5, and origin_col=6. It should be noted that there is a possibility that a plurality of rectangular blocks in FIG. 29 correspond to the same unit in the FR, and the solution is to retain the most reliable code point 500. Since the center coordinates of the data storage block are calculated according to the coordinate interpolation of adjacent coordinate calibration code points, different interpolation manners have different degrees of credibility due to different relative positions of the data storage blocks and the coordinate calibration blocks. The credibility is defined as follows:

The credibility scores 15 according to an interpolation manner in FIG. 21 or FIG. 22.

The credibility scores 10 according to an interpolation manner in FIG. 23 or FIG. 24.

The credibility scores 7 according to any one of interpolation manners in FIG. 25 to FIG. 28.

TABLE 2

| ff | f0 | ff | f1 | ff | f2 |
|----|----|----|----|----|----|
| f3 | f4 | f5 | f6 | f7 | f8 |
| ff | f0 | ff | f1 | ff | f2 |
| f3 | f4 | f5 | f6 | f7 | f8 |
| ff | f0 | ff | f1 | ff | f2 |
| f3 | f4 | f5 | a6 | 77 | a8 |

Table 2 is the FR matrix obtained according to the above method, each unit is an 8-bit hexadecimal number, the lower 4-bit value is the value stored in the data storage block, the high 4-bit value is the credibility, and in particular, the value ff corresponds to the coordinate calibration blocks and the direction indication block in the dot matrix code. So far, the complete decoding restores the data stored in FIG. 12, that is, 3 sets of novenary numbers 0 to 8.

Those skilled in the art will recognize that it is possible to make many variations to the above description, and all embodiments are merely used to describe one or more specific implementation modes. For example, the two-dimensional dot matrix barcode is composed of M×N virtual code point storage blocks, where M≥4, N≥4, and both M and N are even numbers. The technical effect of the present invention can be achieved by encoding in the following manners: forming a plurality of coordinate calibration blocks, a plurality of data storage blocks and a direction indication block by filling code points into the virtual code point storage blocks respectively, wherein code points filled in the plurality of coordinate calibration blocks are located in the centers of the virtual code point storage blocks; the direction indication block is filled with at least two code points, only one code point being located in the center of the virtual code point storage block; the plurality of coordinate calibration blocks and the direction indication block are separated from each other and distributed among the plurality of data storage blocks; code points filled in the plurality of data storage blocks are used to store data information; and the plurality of coordinate calibration blocks and the plurality of data storage blocks have only one code point.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A two-dimensional dot matrix barcode encoding method, wherein a two-dimensional dot matrix barcode is composed of M×N virtual code point storage blocks, and a plurality of coordinate calibration blocks, a plurality of data storage blocks and a direction indication block are formed by filling code points into the virtual code point storage blocks respectively, wherein
   code points filled in the plurality of coordinate calibration blocks are located in the center of the virtual code point storage block;
   the direction indication block is filled with at least two code points, only one code point being located in the center of the virtual code point storage block;
   the plurality of coordinate calibration blocks and the direction indication block are separated from each other and distributed among the plurality of data storage blocks;
   code points filled in the plurality of data storage blocks are used to store data information; and
   the plurality of coordinate calibration blocks and the plurality of data storage blocks have only one code point,
   where M≥4, N≥4, and M and N are both even numbers.

2. The two-dimensional dot matrix barcode encoding method of claim 1, which wherein in the two-dimensional dot matrix barcode, the virtual code point storage blocks in which row coordinates and column coordinates are both odd or even are coordinate calibration blocks and the direction indication block, and the remaining virtual code point storage blocks are the data storage blocks.

3. The two-dimensional dot matrix barcode encoding method of claim 1, wherein the plurality of coordinate calibration blocks, the plurality of data storage blocks and one direction indication block are divided into 3×3 sub-blocks by virtual row and column lines respectively, and a central sub-block of each coordinate calibration block is filled with a code point; only one sub-block in each data storage block is filled with a code point, and the data storage blocks store different data by filling code points in different sub-blocks; and at least two sub-blocks in the direction indication block are filled with code points.

4. The two-dimensional dot matrix barcode encoding method of claim 1, wherein the code points filled in the direction indication block do not overlap after being rotated by ±90° or 180° around the geometric center thereof.

5. A two-dimensional dot matrix barcode reading method, used for identifying a two-dimensional dot matrix barcode obtained by the two-dimensional dot matrix barcode encoding method according to claim 1, the two-dimensional dot matrix barcode reading method comprising the following steps:
   acquiring a barcode grayscale image not smaller than the size of a two-dimensional dot matrix barcode, the grayscale image comprising at least one direction indication block and a plurality of coordinate calibration blocks;
   acquiring row and column positions of the coordinate calibration blocks and the direction indication block in the two-dimensional dot matrix barcode according to the grayscale image comprising the at least one direction indication block and the plurality of coordinate calibration blocks; and
   reading data stored in the two-dimensional dot matrix barcode according to the grayscale image and the row and column positions of the coordinate calibration blocks and the direction indication block.

6. The two-dimensional dot matrix barcode reading method of claim 5, wherein reading data stored in the two-dimensional dot matrix barcode according to the grayscale image and the row and column positions of the coordinate calibration blocks and the direction indication block comprises:
   S1: performing binarization processing on the grayscale image to obtain a binary image, and marking a code point in the binary image to determine a barycentric coordinate (x, y) of the code point;
   S2: determining a row direction and a column direction of the code point and row dividing points and column dividing points: taking the geometric center of the binary image as a rotation center, determining the row direction and the column direction of the code point by calculating a mean square error of a projection waveform of the barycentric coordinate of the code point in a predetermined direction at each rotation angle of the binary image, then projecting the barycentric coordinate (x, y) of the code point in the row direction and the column direction, and calculating the row dividing points and the column dividing points for the projection waveform by using an autocorrelation method;

S3: rotating and converting the barycentric coordinate (x, y) of the code point according to the row direction and the column direction obtained in step S2, calculating a converted code point coordinate (x1, y1) after rotation, and forming, by using the row dividing points and the column dividing points obtained in step S2, a rectangular mesh for dividing the code point;

S4: constructing a two-dimensional matrix corresponding to the rectangular mesh obtained in step S3, determining, according to the converted code point coordinate (x1, y1), a block in the rectangular mesh to which the converted code point coordinate belongs, and then adding the converted code point coordinate (x1, y1) to a unit of the two-dimensional matrix corresponding to the block;

S5: identifying a rotation direction and an offset of the two-dimensional matrix according to the unit of the two-dimensional matrix in feature matching with the direction indication block; and S6: reconstructing a complete two-dimensional dot matrix barcode according to the rotation direction and the offset, and reading data stored therein.

7. The two-dimensional dot matrix barcode reading method of claim 6, wherein the rotation direction of the two-dimensional matrix is calculated according to a relative position between the coordinate calibration block adjacent to the direction indication block and the converted code point coordinate, and a relative position among the plurality of code points in the direction indication block.

8. The two-dimensional dot matrix barcode reading method of claim 6, wherein reading values stored in the data storage block according to the coordinate calibration block specifically comprises: first, calculating a center coordinate of the data storage block according to the converted code point coordinate (x1, y1) of the coordinate calibration block; and then, reading stored data according to an offset of the converted code point coordinate (x1, y1) relative to the center coordinate in the data storage block.

9. The two-dimensional dot matrix barcode reading method of claim 8, wherein the center coordinate of the data storage block is calculated by using an interpolation method according to the converted code point coordinate (x1, y1) of the coordinate calibration block.

10. The two-dimensional dot matrix barcode reading method of claim 6, wherein the step of reconstructing a complete two-dimensional dot matrix barcode comprises the following sub-steps:

S601: acquiring correct reference positions of the direction indication block, the coordinate calibration block and the data storage block respectively;

S602: identifying units in feature matching with the direction indication block, the coordinate calibration block and the data storage block in the two-dimensional matrix respectively, and determining relative positions of the units in feature matching with the coordinate calibration block and the data storage block by taking the unit in feature matching with the direction indication block as a position origin;

S603: allowing the position origin to overlap with the correct reference position of the direction indication block, and allowing the relative position of the unit in feature matching with the coordinate calibration block of the two-dimensional matrix to overlap with the correct reference position of the coordinate calibration block; and S604: decomposing the virtual code point storage blocks in the two-dimensional matrix with reference to the correct reference positions, and moving them to correct positions, so as to reconstruct a two-dimensional matrix that is the same as the two-dimensional dot matrix barcode in both row-column number and arrangement.

* * * * *